(12) United States Patent
Travis et al.

(10) Patent No.: US 7,970,246 B2
(45) Date of Patent: Jun. 28, 2011

(54) EFFICIENT COLLIMATION OF LIGHT WITH OPTICAL WEDGE

(75) Inventors: Adrian Travis, Seattle, WA (US); Timothy Large, Bellevue, WA (US); Neil Emerton, Redmond, WA (US); Steven Bathiche, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/883,077

(22) Filed: Sep. 15, 2010

(65) Prior Publication Data

US 2011/0044579 A1    Feb. 24, 2011

Related U.S. Application Data

(63) Continuation of application No. 12/621,399, filed on Nov. 18, 2009.

(60) Provisional application No. 61/235,922, filed on Aug. 21, 2009.

(51) Int. Cl.
*G02B 6/26* (2006.01)
*G09F 13/04* (2006.01)

(52) U.S. Cl. ............... 385/43; 385/27; 385/31; 385/146; 385/901; 385/129; 362/610; 362/623; 362/621; 362/97.1

(58) Field of Classification Search ............ 385/31, 385/36, 14, 39, 42, 43, 129, 130, 131, 133, 385/146, 901, 27; 362/623, 621, 619, 611, 362/610, 600, 516, 296.1, 215, 626, 615, 362/97.1, 97.2; 359/641, 201.2; 345/84
See application file for complete search history.

(56) References Cited

U.S. PATENT DOCUMENTS

| | | | | |
|---|---|---|---|---|
| 5,806,955 A * | 9/1998 | Parkyn et al. | ........... | 362/612 |
| 5,838,403 A * | 11/1998 | Jannson et al. | ........... | 349/65 |
| 6,072,551 A * | 6/2000 | Jannson et al. | ........... | 349/64 |
| 6,256,447 B1 * | 7/2001 | Laine | ........... | 385/146 |
| 7,431,489 B2 * | 10/2008 | Yeo et al. | ........... | 362/606 |
| 7,572,045 B2 | 8/2009 | Hoelen et al. | ........... | 362/628 |
| 2006/0146573 A1 | 7/2006 | Iwauchi et al. | ........... | 362/621 |
| 2011/0044579 A1 * | 2/2011 | Travis et al. | ........... | 385/27 |

FOREIGN PATENT DOCUMENTS

| JP | 2002162912 A | 6/2002 |
|---|---|---|
| JP | 2006294361 A | 10/2006 |
| KR | 1020010039013 A | 5/2001 |

OTHER PUBLICATIONS

"International Search Report", Mailed Date: Mar. 2, 2011, Application No. PCT/US2010/046129, Filed Date: Aug. 20, 2010, pp. 9.
ISA Korea Intellectual Property Office, International Search Report of PCT/US2010/046129, Mar. 2, 2011, 3 pages.

* cited by examiner

*Primary Examiner* — Brian M Healy
(74) *Attorney, Agent, or Firm* — Alleman Hall McCoy Russell & Tuttle LLP (57) ABSTRACT

Embodiments of optical collimators are disclosed. For example, one disclosed embodiment comprises an optical waveguide having a first end, a second end opposing the first end, a viewing surface extending at least partially between the first end and the second end, and a back surface opposing the viewing surface. The viewing surface comprises a first critical angle of internal reflection, and the back surface is configured to be reflective at the first critical angle of internal reflection. Further, a collimating end reflector comprising a faceted lens structure having a plurality of facets is disposed at the second end of the optical waveguide.

20 Claims, 6 Drawing Sheets

EFFICIENT COLLIMATION OF LIGHT WITH OPTICAL WEDGE

CROSS-REFERENCE TO RELATED APPLICATIONS

This application claims priority to U.S. patent application Ser. No. 12/621,399, titled EFFICIENT COLLIMATION OF LIGHT WITH OPTICAL WEDGE, filed Nov. 18, 2009, which claims priority to Provisional Application Ser. No. 61/235,922, entitled EFFICIENT COLLIMATION OF LIGHT WITH OPTICAL WEDGE, filed Aug. 21, 2009. The entire disclosures of these applications are incorporated by reference herein.

BACKGROUND

An optical collimator is a device which collects rays from a point source of light such as a light bulb or light emitting diode and causes those rays to emerge in parallel from a surface. Examples of collimators include lenses or curved mirrors found in a flashlight or car headlamp. In these examples, a volume of space exists between the point source and the surface from which the collimated light exits. In some use environments, this space may be inconvenient, as it may increase the overall size of an optical device that utilizes the collimator.

SUMMARY

Accordingly, various embodiments are disclosed herein that relate to optical collimators. For example, one disclosed embodiment provides an optical collimator comprising an optical waveguide having a first end including a first light interface, a second end opposing the first end, a viewing surface that includes a second light interface extending at least partially between the first end and the second end, and a back surface opposing the viewing surface. The viewing surface comprises a first critical angle of internal reflection with respect to a normal of the viewing surface, and the back surface is configured to be reflective at the first critical angle of internal reflection. Further, a collimating end reflector comprising a faceted lens structure having a plurality of facets is disposed at the second end of the optical waveguide.

This Summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Various embodiments of optical collimators are disclosed herein in the form of wedge-shaped light guides, or optical wedges. An optical wedge is a light guide that conducts light between one light interface at an end of the wedge and another light interface at a face of the wedge via total internal reflection. The embodiments disclosed herein each utilize a folded optical path to allow light to fan out to a desired size before collimation, which may allow the reduction in size of the volume between a light source and surface (e.g. wedge face) where the collimated light exits. Such optical wedges may find various uses, including but not limited to as a backlight for a liquid crystal display (LCD).

The subject matter of the present disclosure is now described by way of example and with reference to certain illustrated embodiments. In the accompanying figures, it will be noted that the views of the illustrated embodiments may not be drawn to scale, and the aspect ratios of some features may be exaggerated to make selected features or relationships easier to see.

Figure 1:
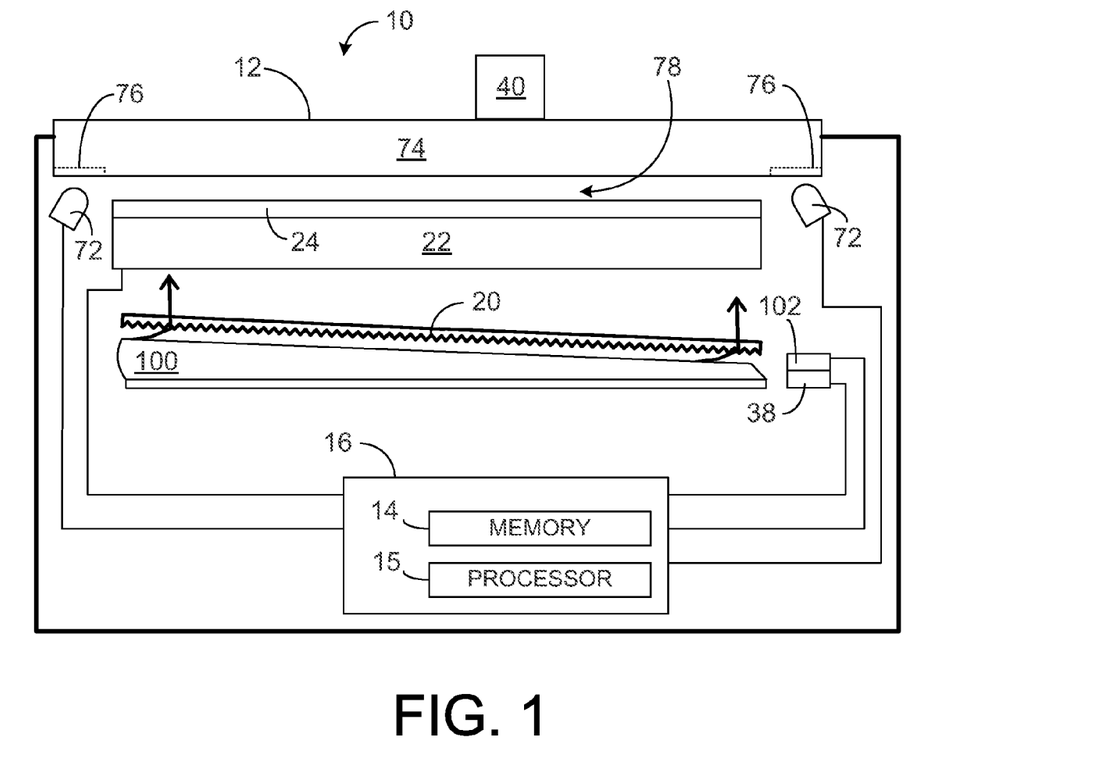
FIG. 1 shows embodiments of an optical device and optical wedge positioned within the optical device.

FIG. 1 shows an embodiment of an optical system 10 which may be configured to provide both display and input functionality for controller 16 via a large-format, touch-sensitive display surface 12. Controller 16 may be any device configured to provide display data to and receive input data from the optical system. In some embodiments, the controller may comprise all or part of a computer; in other embodiments, the controller may be any device operatively coupled to a computer via a wired or wireless communications link. Controller 16 comprises memory 14 and processor 15. Memory 14 may be used to store instructions for execution by processor 15, including routines for controlling optical system 10.

To provide display functionality, optical system 10 may be configured to project a visible image onto touch-sensitive display surface 12. To provide input functionality, the optical system may be configured to capture at least a partial image of objects placed on the touch-sensitive display surface—fingers, electronic devices, paper cards, food, or beverages, for example. Accordingly, the optical system may be configured to illuminate such objects and to detect the light reflected from the objects. In this manner, the optical system may register the position, footprint, and other properties of any suitable object placed on the touch-sensitive display surface.

Optical system 10 includes optical wedge 100, light director 20, light valve 22, diffuser 24, and light source 102. Light source 102 and light valve 22 may be operatively coupled to controller 16 and configured to provide a visual display image to touch-sensitive display surface 12. Light source 102 may be any illuminant configured to emit visible light, such as one or more light emitting diodes, for example. Light from light source 102 is projected through optical wedge 100 and directed to light valve 22 via light director 20. In some embodiments, light director 20 may comprise a film of prisms configured to direct light in a direction normal to light valve 22. The numerous light-gating elements of light valve 22 may be used to modulate light from light director 20 with respect to color and intensity. In some embodiments, the light valve may comprise a liquid-crystal display device, but other light-modulating devices may be used as well. In this manner, the light source and the light valve may together create a display image. The display image is projected through diffuser 24 and is thereby provided to touch-sensitive display surface 12.

Optical system 10 may be further configured to provide input functionality to controller 16. Accordingly, the illustrated optical system includes detector 38, infrared emitters 72, and illuminating light guide 74. Detector 38 may comprise a camera, such as an infrared-sensitive digital camera, for example, or any other suitable image sensing device. Infrared emitters 72 may comprise one or more infrared light-emitting diodes, for example, or any other suitable light source. The illuminating light guide may be any optic configured to receive an injection of infrared light at one or more entry zones 76 and to transmit infrared light reflected off of objects touching the display screen through exit zone 78.

For example, infrared light may be injected by infrared emitters 72 into entry zone 76 of illuminating light guide 74. The infrared light may travel through illuminating light guide 74 via total internal reflection and may leak out along the touch-sensitive display surface 12 (e.g. due to diffusing elements, not shown, arranged along the touch-sensitive display surface 12) until striking one or more objects in contact with touch-sensitive display surface 12, such as object 40. A portion of the infrared light may reflect off of the one or more objects and exit illuminating light guide 74 at exit zone 78. The infrared light may travel from exit zone 78, through diffuser 24 and light valve 22, and strike a surface of optical wedge 100, which may be configured to direct incident infrared light onto detector 38. It will be understood however, that numerous other illumination configurations are possible, and are within the scope of the present disclosure.

Figure 2:
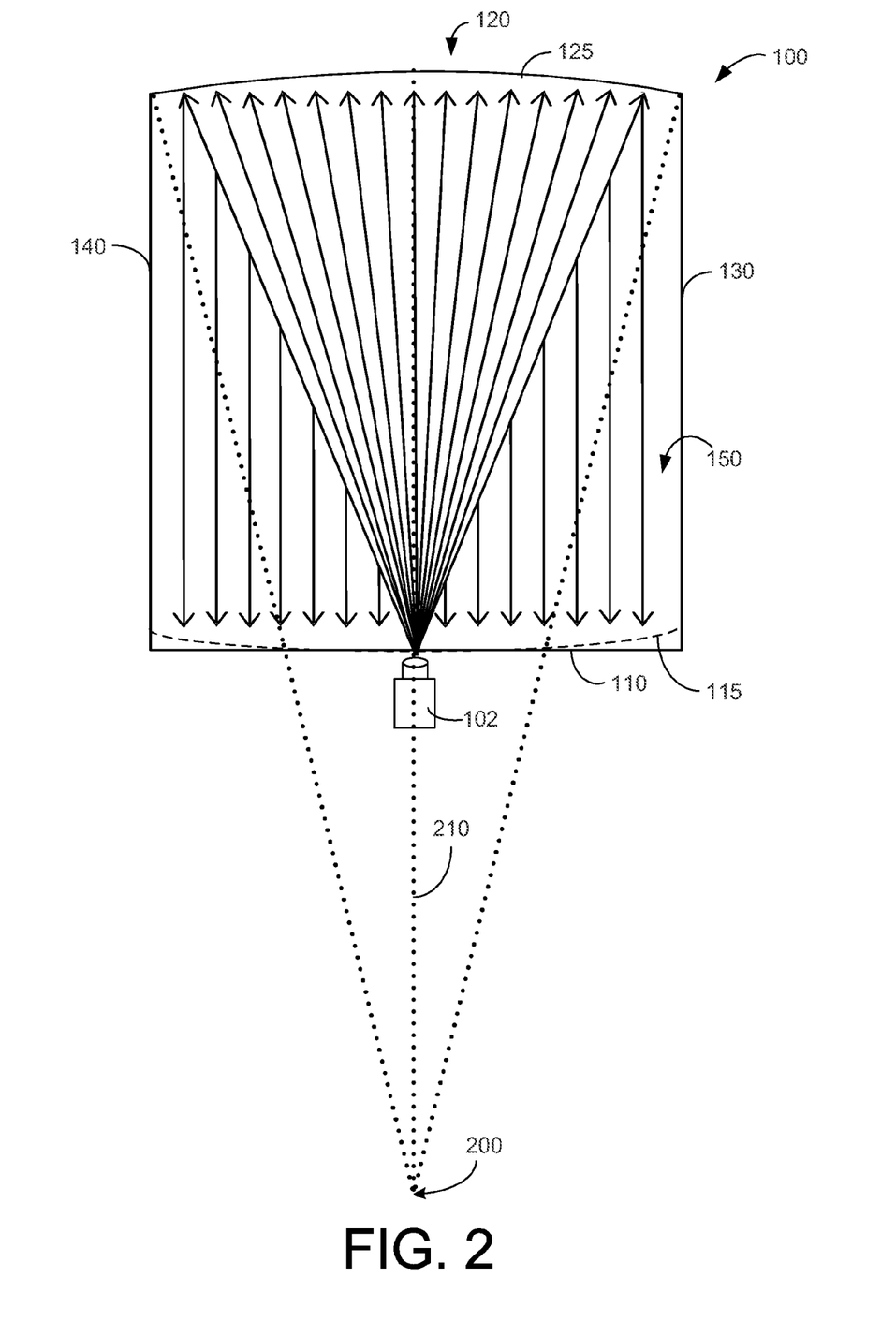
FIG. 2 is a schematic, plan view showing an embodiment of an optical wedge.

Referring next to FIG. 2, optical wedge 100 may be configured to collimate light from light source 102 disposed adjacent to a thin end 110 of optical wedge 100, such that collimated light exits viewing surface 150 of optical wedge 100, as shown by the ray traces in FIG. 2. The term "viewing surface" indicates that viewing surface 150 is closer to a viewer than a back surface (not visible in FIG. 2) which is opposite of viewing surface 150. Each of the viewing and back surfaces is bounded by sides 130 and 140, thin end 110, and thick end 120. In FIG. 2, viewing surface 150 faces a viewer of the page and the back surface is hidden by this view of optical wedge 100.

Optical wedge 100 is configured such that light rays injected into a light interface of thin end 110 may fan out as they approach thick end 120 comprising end reflector 125. The light rays are delivered to end reflector 125 via total internal reflection from viewing surface 150 and the back surface. In the preferred embodiment, end reflector 125 is curved with a uniform radius of curvature having center of curvature 200, and light source 102 injecting light at the focal point of end reflector 125, the focal point being at one half the radius of curvature. At thick end 120, each of the light rays reflects off of end reflector 125 parallel to each of the other light rays. The light rays travel from thick end 120 toward thin end 110 until the light rays intersect viewing surface 150 at a critical angle of reflection of viewing surface 150 and the light rays exit as collimated light. In an alternative embodiment, end reflector 125 may be parabolic or have other suitable curvature for collimating light.

In other embodiments, a plurality of light sources may be disposed adjacent to and along thin end 110. The use of a plurality of light sources may increase the brightness of the collimated light exiting viewing surface 150 compared to the use of a single light source. In such embodiments, to correct for field curvature and/or spherical aberration, it may be desirable to slightly shorten sides 130 and 140 of optical wedge 100 so that a light source to either side of center line 210 may stay in the focal point of end reflector 125. Shortening sides 130 and 140 may make thin end 110 convex, as illustrated by curve 115. A suitable curvature may be found by using a ray-tracing algorithm to trace rays at a critical angle of reflection of viewing surface 150 of optical wedge 100 back through optical wedge 100 until the rays come to a focus near thin end 110.

Figure 3:
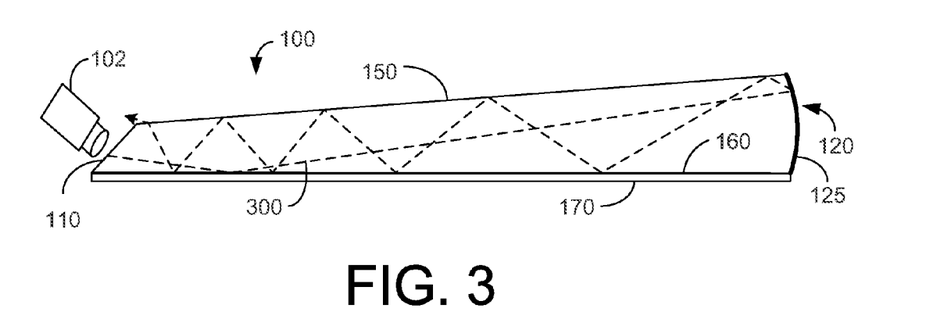
FIGS. 3 and 4 show ray traces through a sectional view of the embodiment of FIG. 2.
Figure 4:
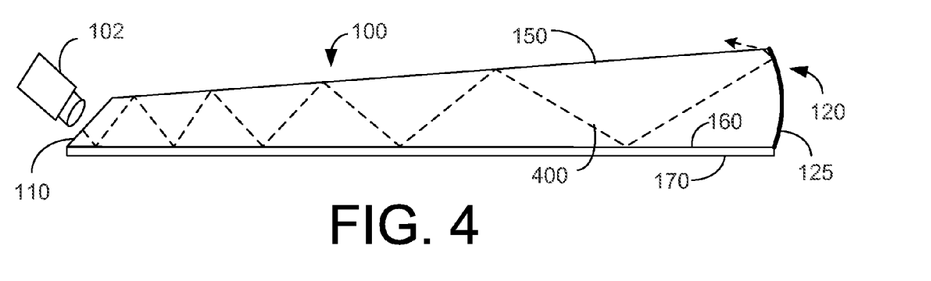

FIGS. 3 and 4 show ray traces through a schematic cross-sectional view of optical wedge 100. FIG. 3 shows the path of a first ray 300 through optical wedge 100, and FIG. 4 shows the path of a second ray 400 through optical wedge 100, wherein rays 300 and 400 represent rays located at opposite sides of a cone of light that is input into thin end 110 of optical wedge 100. As can be seen in FIGS. 3 and 4, ray 300 exits viewing surface 150 adjacent to thin end 110 of optical wedge 100, while ray 400 exits viewing surface 150 adjacent to thick end 120 of optical wedge 100.

Rays 300 and 400 exit viewing surface 150 once the rays 300 and 400 intersect viewing surface 150 at an angle less than or equal to a critical angle of internal reflection with respect to a normal of viewing surface 150. This critical angle may be referred to herein as the "first critical angle." Likewise, rays reflect internally in optical wedge 100 when the rays intersect viewing surface 150 at an angle greater than the first critical angle of internal reflection with respect to the normal of viewing surface 150. Further, rays reflect internally in optical wedge 100 when the rays intersect back surface 160 at an angle greater than a critical angle of internal reflection with respect to the normal of back surface 160. This critical angle may be referred to herein as the "second critical angle."

As explained in more detail below with reference to FIG. 5, it may be desirable for the first critical angle and the second critical angle to be different, such that light incident on back surface 160 at the first critical angle is reflected back toward viewing surface 150. This may help to prevent loss of light through the back surface 160, and therefore may increase the optical efficiency of the optical wedge 100. The first critical angle is a function of the refractive index of optical wedge 100 and the index of refraction of the material interfacing viewing surface 150 (e.g. air or a layer of a cladding), while the second critical angle is a function of the refractive index of optical wedge 100 and the material adjacent to back surface 160. In some embodiments, such as that shown in FIGS. 3-4, a layer of cladding 170 may be applied only to back surface 160, such that viewing surface 150 interfaces with air. In other embodiments, viewing surface 150 may comprise a layer of cladding (not shown) with a different refractive index than back surface 160.

Any suitable material or materials may be used as cladding layers to achieve desired critical angles of internal reflection for the viewing and/or back surfaces of an optical wedge. In an example embodiment, optical wedge 100 is formed from polymethyl methacrylate, or PMMA, with an index of refraction of 1.492. The index of refraction of air is approximately 1.000. As such, the critical angle of a surface with no cladding is approximately 42.1 degrees. Next, an example cladding layer may comprise Teflon AF (EI DuPont de Nemours & Co. of Wilmington, Del.), an amorphous fluoropolymer with an index of refraction of 1.33. The critical angle of a PMMA surface clad with Teflon AF is 63.0 degrees. It will be understood that these examples are described for the purpose of illustration, and are not intended to be limiting in any manner.

In other embodiments, back surface 160 may include a mirror. As non-limiting examples, the minor may be formed by applying a reflective coating to back surface 160 or by placing a minor adjacent to back surface 160. In this manner, back surface 160 may reflect incident light intersecting back surface 160. When back surface 160 is configured to reflect some or all incident light, back surface 160 may be referred to herein as the "reflective back surface." Non-limiting examples of a reflective back surface include a back surface having a mirrored surface, a mirror placed adjacent to the back surface, a back surface having a second critical angle of internal reflection with respect to a normal of the back surface, wherein the second critical angle of reflection is less than the first critical angle of reflection, or any other configuration in which the back surface is reflective to internally incident light at the first critical angle of internal reflection.

The configuration of optical wedge 100 and end reflector 125 may be configured to cause a majority of viewing surface 150 to be uniformly illuminated when uniform light is injected into thin end 110, and also to cause a majority of the injected light to exit viewing surface 150. As mentioned above, optical wedge 100 is tapered along its length such that rays injected at thin end 110 travel to end reflector 125 via total internal reflection. End reflector 125 comprises a faceted lens structure configured to decrease the ray angle relative to a normal to each of viewing surface 150 and back surface 160. In addition, the diminishing thickness of optical wedge 100 from thick end 120 to thin end 110 causes ray angles to diminish relative to the normal of each surface as rays travel toward thin end 110. When a ray is incident on viewing surface 150 at less than the first critical angle, the ray will exit viewing surface 150.

In some embodiments, light source 102 may be positioned at a focal point of end reflector 125. In such embodiments, end reflector 125 may be curved with a radius of curvature that is twice the length of optical wedge 100. In the embodiment of FIGS. 3-4, the taper angle of optical wedge 100 is configured so that the corner at thick end 120 and viewing surface 150 comprises a right angle and the corner at thick end 120 and back surface 160 comprises a right angle. When thin end 110 is at the focal point of end reflector 125, thin end 110 is one half the thickness of thick end 120. In other embodiments, each of these structures may have any other suitable configuration.

In the depicted embodiment, end reflector 125 is spherically curved from side 130 to side 140 and from viewing surface 150 to back surface 160. In other embodiments, end reflector 125 may be cylindrically curved with a uniform radius of curvature from viewing surface 150 and back surface 160 and a center of curvature where viewing surface 150 and back surface 160 would meet if extended. A cylindrically curved end reflector may resist sag more strongly than a spherically curved end reflector 125, which may be beneficial in large format applications. Other suitable curvatures may be used for end reflector 125, such as parabolic, for example. Additionally, the curvature of end reflector 125 in the plane perpendicular to sides 130 and 140 may differ from the curvature of end reflector 125 in the plane parallel to sides 130 and 140.

As mentioned above, it may be desirable for the critical angles of reflection of viewing surface 150 and back surface 160 to be different. This may help to prevent loss of light through back surface 160, as illustrated in FIG. 5, which shows a schematic, magnified cross-sectional view of end reflector 125 of the embodiment of the optical wedge in FIGS. 2-4. End reflector 125 comprises a faceted lens structure comprising a plurality of facets arranged at an angle relative to a surface of thick end 120. The plurality of facets alternate between facets facing viewing surface 150, such as facet 530, and facets facing back surface 160, such as facet 540. End reflector 125 conforms to a general curvature as described above, with end reflector normal 542 and end reflector normal 532 extending toward the center of curvature. Each of the plurality of facets has a height and an angle relative to a normal of a surface of the end reflector. For example, one of the facets facing viewing surface 150 has a height 538 and an angle 536 relative to end reflector normal 532 and facet normal 534. As another example, one of the facets facing back surface 160 has a height 548 and an angle 546 relative to end reflector normal 542 and facet normal 544.

The height of each of the plurality of facets may affect the uniformity and the brightness of collimated light exiting viewing surface 150. For example, larger facets may create optical paths that differ from the ideal focal length, which may cause Fresnel banding. As such, in embodiments where such banding may pose issues, it may be desirable to make the height of each of the plurality of facets less than 500 microns, for example, so that such banding is less visible.

Likewise, the angle of each of the plurality of facets also may affect the uniformity and brightness of collimated light exiting viewing surface 150. Ray 500 illustrates how facet angles may affect the path of a ray through optical wedge 100. Ray 500 is injected into thin end 110, travel through optical wedge 100 and strikes end reflector 125. Half of ray 500 strikes facet 530 facing viewing surface 150. The portion of ray 500 striking facet 530 is reflected as ray 510 toward viewing surface 150. Ray 510 intersects viewing surface 150 at an angle less than or equal to the first critical angle of internal reflection with respect to a normal of viewing surface 150, and thus exits the viewing surface 150 as ray 512.

The other half of ray 500 strikes facet 540 facing back surface 160. The portion of ray 500 striking facet 540 is reflected as ray 520 toward back surface 160. Because of the difference between the critical angles of viewing surface 150 and back surface 160, ray 520 intersects back surface 160 at an angle greater than the second critical angle of internal reflection with respect to a normal of back surface 160, and thus reflects as ray 522 toward viewing surface 150. Ray 522 then intersects viewing surface 150 at an angle less than or equal to the first critical angle of internal reflection with respect to a normal of viewing surface 150, and thus exits as ray 524. In this manner, a majority (and in some embodiments, substantially all) of the light that reflects from end reflector 125 exits viewing surface 150.

Due to light being separately reflected by facets facing viewing surface 150 and facets facing back surface 160, overlapping, superimposed first and second images arranged in a head-to-tail orientation may be formed at viewing surface 150. The degree of overlap between these images may be determined by the angles of the facets 530 and 540. For example, the two images are completely overlapping when each facet has an angle relative to a normal of a surface of the end reflector of three-eighths of a difference between ninety degrees and the first critical angle of reflection, as explained in more detail below. In this instance, substantially all light input into optical wedge 100 exits the viewing surface 150. Varying the facets from this value decreases the amount of overlap between images, such that only one or the other of the two images is displayed where the angles of the facets are ¼ or ½ of the difference between ninety degrees and the first critical angle of reflection. Further, varying the angles of the facets from three-eighths of the difference between ninety degrees and the first critical angle of reflection also causes some light to exit from the thin end of optical wedge 100, rather than from viewing surface 150. Where the angles of the facets are ¼ or ½ of the difference between ninety degrees and the first critical angle of reflection, the viewing surface also may be uniformly illuminated, but half of the light exits from the thin end of optical wedge 100, and is therefore lost.

It will be understood that, depending upon the desired use environment, it may be suitable to use facet angles other than three-eighths of the difference between ninety degrees and the first critical angle of reflection to produce collimated light. Such use environments may include, but are not limited to, environments in which any regions of non-overlapping light (which would appear to have a lower intensity relative to the overlapping regions) are not within a field of view observed by a user.

In an alternative embodiment, the faceted lens structure of end reflector 125 may comprise a diffraction grating. The grating equation may be used to calculate an angle of diffraction for a given angle of incidence and a given wavelength of light. Since the angle of diffraction is dependent on the wavelength of the light, an end reflector comprising a diffraction grating may be desirable when the injected light is monochromatic.

Figure 5:
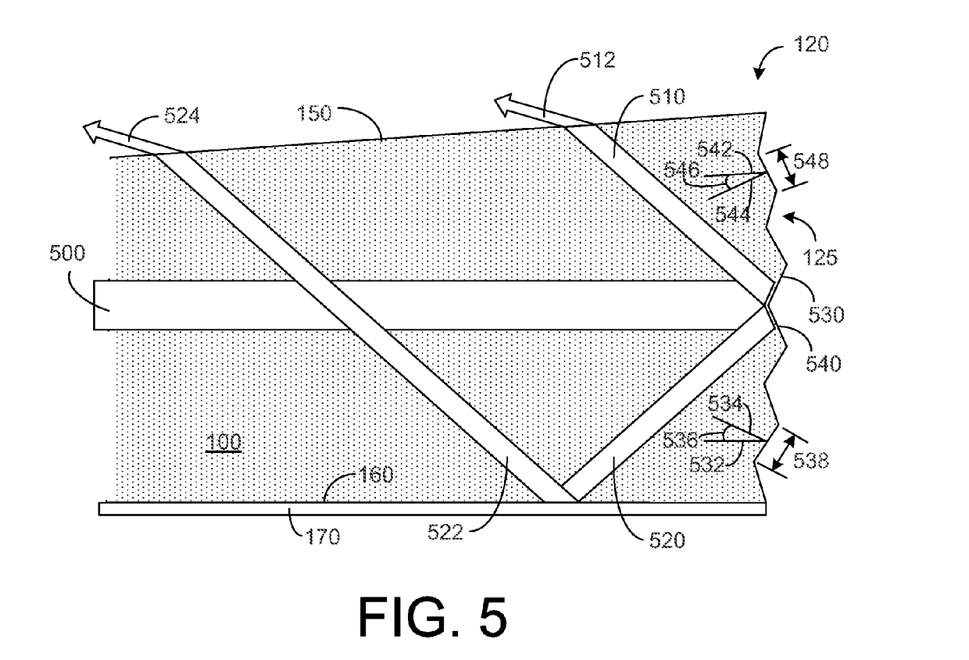
FIG. 5 shows a schematic, magnified cross-sectional view of an end reflector of the embodiment of FIG. 2.
Figure 6:
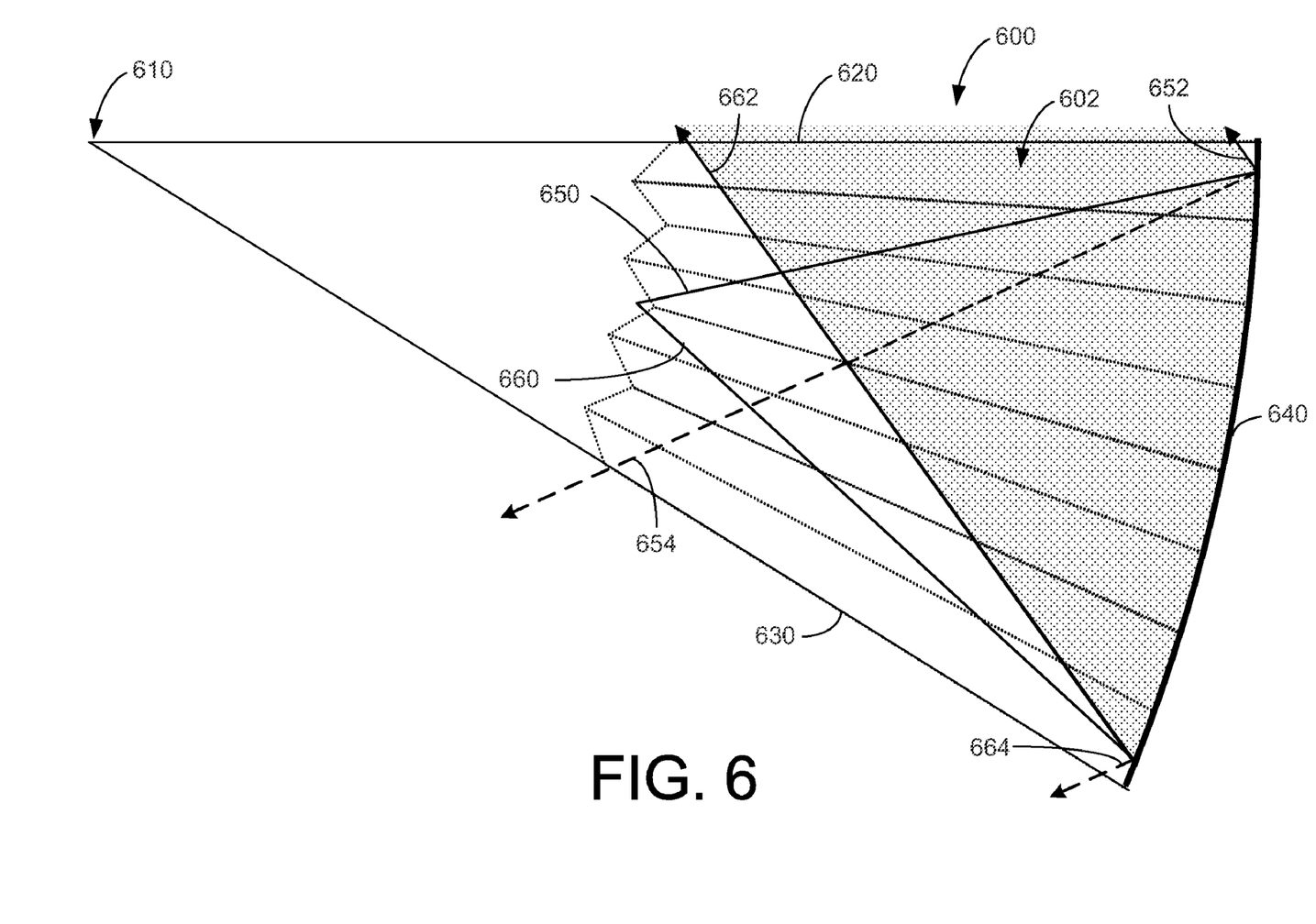
FIGS. 6 and 7 show the ray traces of FIG. 2 as paths through a stack of replicates of the embodiment of FIG. 2.
Figure 7:
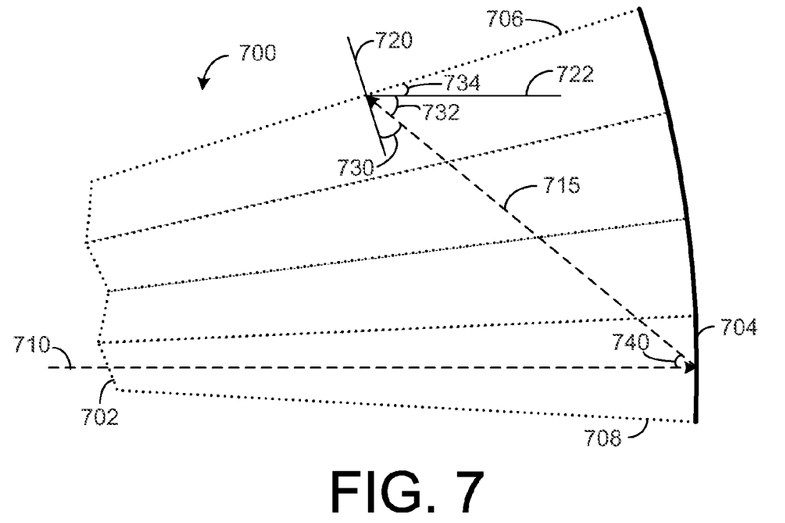

FIGS. 6 and 7 illustrate the travel of light through optical wedge 100 as paths of rays through a stack of optical wedges, each optical wedge being a replicate of the embodiment of optical wedge 100 to further illustrate the concepts shown in FIG. 5. Tracing rays through a stack of replicates of an optical wedge is optically equivalent to tracing a ray's path within an optical wedge. Thus, in this manner, each internal reflection of a ray is shown as the passage of the ray through a boundary from one optical wedge to an adjacent optical wedge. In FIG. 6, the viewing surface is shown as viewing surface 620 of a topmost wedge in the stack of optical wedges 600. The back surface is shown as back surface 630 of a bottommost wedge in the stack of optical wedges 600. The thick ends of the stack of optical wedges 600 join to form what is approximately a curve 640 centered on the axis 610 where all the surfaces converge. In FIG. 6, the thick end of each wedge is shown as having the same general curvature. However, it will be understood that the thick end of each wedge may have any other suitable curvature.

FIG. 6 also depicts two rays of light 650 and 660 located at opposite sides of a cone of light that is injected into a thin end of the optical wedge stack 600. For each ray 650 and 660, after reflection from the end reflector, half of the ray emerges near the thick end of the optical wedge stack 600 (and hence from the represented optical wedge), as shown by solid lines 652 and 662, and half of the ray emerges from the thin end of the optical wedge stack, as shown by dashed lines 654 and 664. Rays injected at any angle between these two extremes will also be split by the faceted pattern in the end reflector, and emerge from the viewing surface and back surface of the optical wedge in a similar manner. The rays exiting viewing surface 620 parallel to rays 652 and 662 are represented by shaded area 602. As mentioned above, it will be understood that rays shown as being emitted through back surface 630 of the optical wedge may instead be reflected by the back surface and then out of the viewing surface by utilizing a cladding (not shown) on the back surface of the optical wedge that has a lower refractive index than a cladding (not shown) utilized on a viewing surface of the optical wedge. In this manner, substantially all light that is injected into the thin end of such an optical wedge may be emitted from the viewing surface of the optical wedge.

For the viewing surface to be uniformly illuminated (e.g. where the images reflected from facets 530 and 540 are fully overlapping), a ray injected at the thin end and travelling horizontally toward the end reflector, coincident with a normal of the end reflector, reflects off of a facet facing the viewing surface and travels to the center of the viewing surface, intersecting the viewing surface at the critical angle of the viewing surface. FIG. 7 shows a schematic depiction of a path of such a ray through a stack of optical wedges 700. Ray 710 is injected at thin end 702 of the optical wedge and reflects off end reflector 704 as ray 715. Ray 715 travels to the center of viewing surface 706, intersecting viewing surface 706 at critical angle of reflection 730 relative to viewing surface normal 72. The sum of angles 732 and 734 is the difference of ninety degrees and critical angle of reflection 730. When the thin end of the optical wedge is one half the thickness of the thick end of the optical wedge, the center point of the wedge is three-fourths the thickness of the optical wedge. Using a paraxial approximation, angle 732 is three-fourths of the difference of ninety degrees and critical angle of reflection 730. Horizontal line 722 is parallel to injected ray 710 so angle 740 is equal to angle 732. From the law of reflection, the angle of incidence is equal to the angle of reflection so the facet angle may be one half of angle 740. Therefore, for the viewing surface to be uniformly illuminated, each facet facing the viewing surface may form an angle relative to a normal of a surface of the end reflector of three-eighths of a difference between ninety degrees and critical angle of reflection 730, as mentioned above.

Any suitable light source may be used to inject light into optical wedge 100. Examples include, but are not limited to, light emitting diodes (LED). It will be noted that light radiates from a bare LED in a Lambertian pattern. However, for increased optical efficiency relative to a bare LED, it may be desired for light to be injected into the optical wedge so that all rays are at angles between the two solid line rays 650 and 660 shown in FIG. 6, i.e. at angles relative to the plane of the optical wedge which are between 0° and half the difference of ninety degrees minus the critical angle. Therefore, the LED may be placed at the focal point of a concentrator designed so that its exit thickness approximately equals the thickness of the thin end of the wedge and the angular range of its emission approximately equals the range shown by rays 650 and 660.

Figure 8:
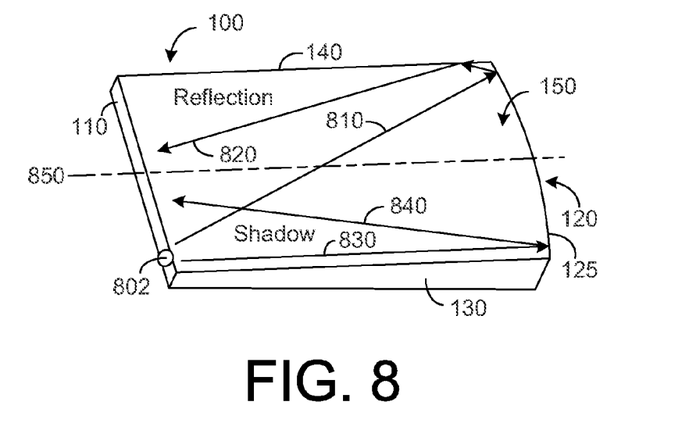
FIGS. 8 and 9 show ray traces through a perspective view of an embodiment of an optical wedge comprising reflective sides.
Figure 9:
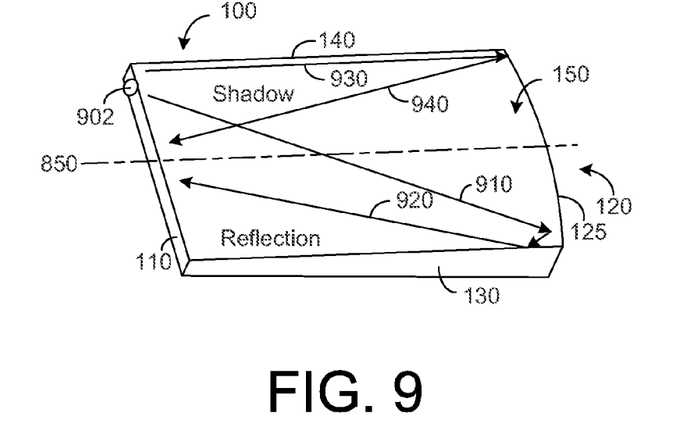

In some embodiments, a plurality of light sources may be positioned adjacent to and along a thin end of the optical wedge to increase an intensity of output collimated light. The output from optical wedge 100 of such an array of light sources may be analyzed by analyzing each of light sources and then combining the results using the superposition principle. This may help in the design of a system that produces uniform collimated light using such an array of light sources, as illustrated by FIGS. 8 and 9, which show a schematic view of paths of rays through an example optical wedge. Optical wedge 100 in FIGS. 8 and 9 comprises thin end 110, thick end 120, sides 130 and 140, and viewing surface 150 having centerline 850. Thick end 120 includes end reflector 125. Sides 130 and 140 may be reflective. Light sources 802 and 902 are disposed adjacent thin end 110 equidistant from centerline 850.

In FIG. 8, a cone of light bounded by rays 810 and 830 is injected at thin end 110 by light source 802. Ray 830 intersects end reflector 125 and is reflected as ray 840. Ray 810 intersects end reflector 125 and is reflected as ray 820 after an additional reflection from side 140. As shown in FIG. 8, the collimated light emitted from viewing surface 150 may not be uniform in this configuration. For example, a region between ray 820 and side 140, labeled "Reflection", may be brighter than a region between ray 820 and side 130 due to the rays reflected from side 140 being emitted from the viewing surface in addition to rays reflected directly from end reflector 125 in the region between ray 820 and side 140. Further, a region between side 130 and ray 840, labeled "Shadow", may be dimmer than a region between 840 and side 140 due to a shadow caused by ray 840 being reflected away from side 130.

In FIG. 9, light source 902 is the same distance from centerline 850 as light source 802, but positioned on an opposite side of centerline 850. A cone of light bounded by rays 910 and 930 is injected at thin end 110 by light source 902. Ray 930 intersects end reflector 125 and is reflected as ray 940. Ray 910 intersects end reflector 125 and is reflected as ray 920 after an additional reflection from side 130. As described above with respect to FIG. 8, the collimated light emitted from viewing surface 150 may not be uniform in this configuration. A region between ray 920 and side 130, labeled "Reflection", may be brighter than a region between ray 920 and side 140. Further, a region between side 140 and ray 940, labeled "Shadow", may be dimmer than a region between 840 and side 140.

When light sources 802 and 902 are positioned similar distances from centerline 850, the borders of the "Reflection" region in FIG. 8 may be matched to the borders of the "Shadow" region in FIG. 9. Likewise, the borders of the "Shadow" region in FIG. 8 may be matched to the borders of the "Reflection" region in FIG. 9. The regions of shadow and reflection may cancel each other out if the brightness of light sources 802 and 902 are similar such that the light injected at thin end 110 by each light source is of similar brightness and uniformity.

Figure 10:
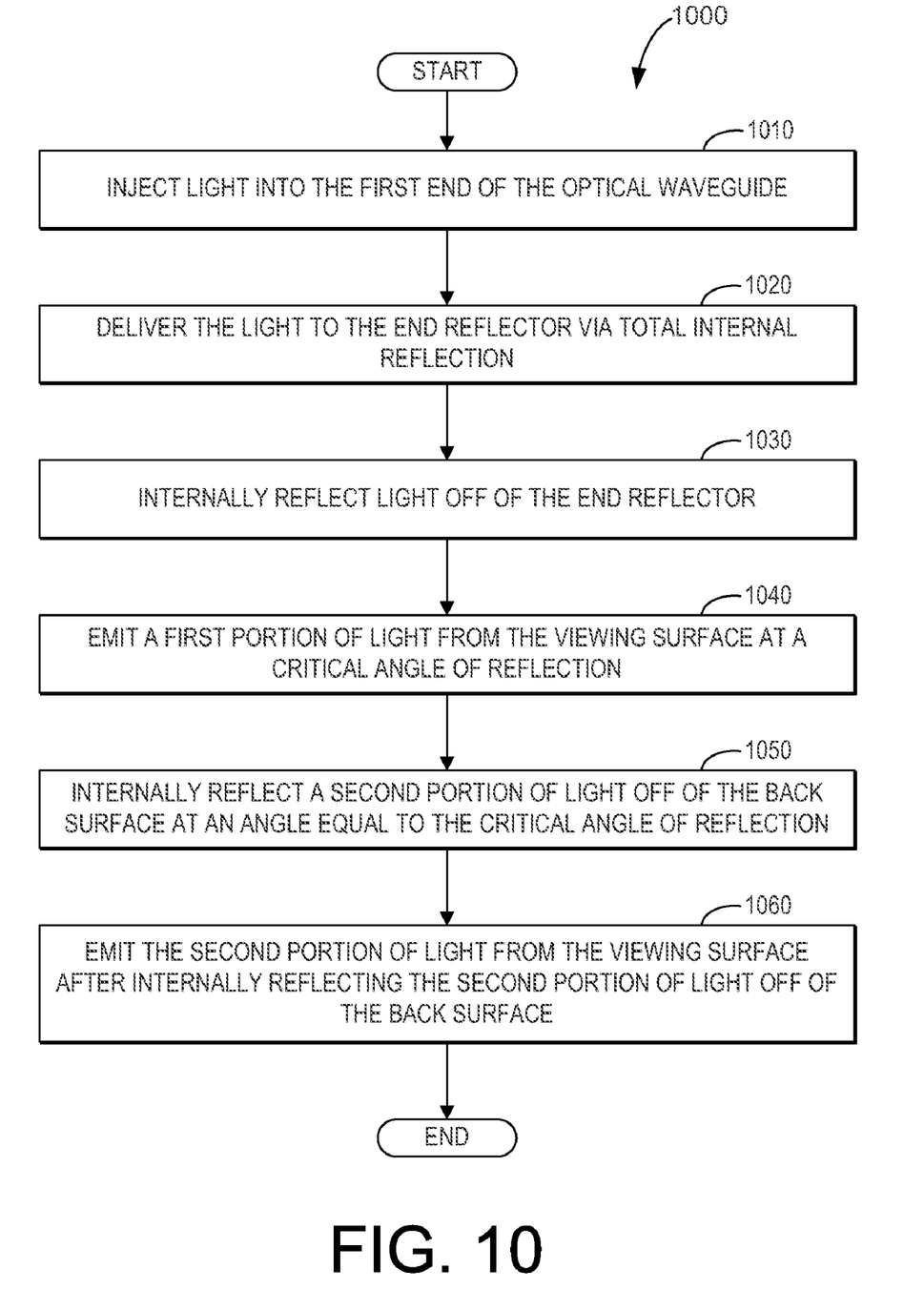
FIG. 10 shows an embodiment of a method for collimating light.

FIG. 10 shows an example method 1000 for collimating light via an optical waveguide. The optical waveguide may comprise a first end, a second end opposite the first end and comprising an end reflector comprising a plurality of facets, a viewing surface extending between the first end and the second end, and a back surface opposing the viewing surface. The viewing surface may have a first critical angle of reflection and the back surface may have a second critical angle of reflection, wherein the first and second critical angles of reflection are different. In one embodiment, the optical waveguide is the optical wedge of FIG. 2, where the thin end of the optical wedge is the first end of the optical waveguide and the thick end of the optical wedge is the second end of the optical waveguide. In an alternate embodiment, the optical waveguide may have a constant thickness, e.g. the first end and the second end are the same thickness. The optical waveguide may include a cladding on the viewing and/or back surface with a refractive index that varies linearly between the first end and the second end. This embodiment will behave similarly to an optical wedge when light is injected into the first end of the optical waveguide. In yet another embodiment, the optical waveguide may have a constant thickness, a refractive index that varies linearly between the first end and the second end, and claddings on the viewing and/or back surface of constant refractive index. This embodiment will also behave similarly to an optical wedge when light is injected into the first end of the optical waveguide.

Returning to FIG. 10, at 1010, light may be injected into the first end of the optical waveguide, and then at 1020, the light may be delivered to the end reflector via total internal reflection. At 1030, the light may be internally reflected off of the end reflector. The light internally reflected off of the end reflector may be reflected from a first set of facets and a second set of facets, each of the first set of facets having a normal that points at least partially toward the viewing surface, and each of the second set of facets having a normal that points at least partially toward the back surface. Furthermore, in some embodiments, each of the first set of facets may have an angle of three-eighths of a difference between ninety degrees and the critical angle of reflection and each of the second set of facets may have an angle of three-eighths of the difference between ninety degrees and the critical angle of reflection. In other embodiments, the facets may have other suitable angles that do not cause unsuitable variations in light intensities.

Due to the angle at which facets on the end reflector are angled, at 1040, a first portion of light may be emitted from the viewing surface, the first portion of light intersecting the viewing surface at the first critical angle of reflection. At 1050, a second portion of light may be internally reflected from the back surface at an angle equal to the first critical angle of reflection when the second critical angle of reflection is less than the first critical angle of reflection. At 1060, the second portion of light may then be emitted from the viewing surface after internally reflecting from the back surface.

Among the potential uses of such a flat panel collimator is that of illuminating a liquid crystal panel. A liquid crystal display is an inexpensive way of displaying video and comprises a liquid crystal panel behind which is placed a backlight. Past wedge backlights have utilized a slim transparent wedge with light sources along the thick end and films which direct light through the liquid crystal panel to the viewer so that they may see the displayed image. Considerable effort is taken to ensure that emission from the backlight is sufficiently diffuse so that the displayed image can be seen from a wide field of view. For example, some past wedges were filled with scattering sites. With diffuse illumination, however, it is difficult to use the liquid crystal panel in anyway other than as a conventional display.

There exist many applications where it is desirable to project a video image. This may be done by placing a lens in front of a liquid crystal display. However, if the illumination is diffuse, the lens has to be large and therefore expensive. A flat panel collimator can be a slim way of illuminating a small liquid crystal panel or other spatial light modulator with collimated light which may be condensed through a small projection lens. If the spatial light modulator is reflective, as in the case of a digital micromirror device, no beam splitter or other space for illumination is needed. Therefore, the projection lens may be brought as close to in the light modulator as desired.

In some applications, it may be desired to project an image only a few millimeters onto a screen. This may be done in the same way that the sun projects the shadow of trees onto the ground: illuminate a large liquid crystal panel with collimated light, and its shadow, e.g. an image, can be formed on a diffuser spaced a few millimeters away from the liquid crystal panel. One application for this is where it is desired that there be a video image on every key of a keyboard. Were a separate display screen to be formed on each keyboard key, the cost of so many small displays may be prohibitive. However, using a collimating optical wedge backlight as described above, transparent keys may be provided with diffusive surfaces and placed over a liquid crystal panel with a collimated backlight. In this manner, an image may be projected up to each key from different areas of a single large but low cost panel.

Another example application for shadow projection is in the projection of an image onto a diffuser where fingers or objects which touch the diffuser are to be sensed with an infrared camera behind. Devices such as Microsoft's SURFACE, developed and sold by the Microsoft Corporation of Redmond, Wash., comprise a video projector, infrared lamp, camera and diffuser. The projector creates a video image on the diffuser, and the lamp illuminates objects nearby so that they appear blurred when off the diffuser but sharp at the moment of touch. The imaging optics can be made slim by pointing the camera at the diffuser via an optical wedge, such as the embodiments described above. If the liquid crystal display is illuminated by diffuse light, the projected image may be spatially separate from the diffuser, and therefore may be blurred. Therefore, the liquid crystal panel may be illuminated with collimated light as disclosed above so that a visible image without blurring forms at the diffuser. In some embodiments, the panel for providing collimated visible illumination and detecting the infrared image are the same, and the end reflector comprises facets at an angle according to this disclosure that reflect visible light but transmit infrared light, and beyond these are placed facets or equivalent which reflect infrared light and are angled so as to form a single unambiguous image.

It will be understood that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An optical collimator comprising:
    an optical waveguide having
        a first end comprising a first light interface;
        a second end opposite the first end;
        a viewing surface comprising a second light interface extending at least partially between the first end and the second end and having a first critical angle of internal reflection with respect to a normal of the viewing surface;
        a back surface opposing the viewing surface, the back surface being configured to be reflective to internally incident light at the first critical angle of internal reflection; and
        a collimating end reflector arranged at the second end of the optical waveguide, wherein the collimating end reflector comprises a faceted lens structure.

2. The optical collimator of claim 1, wherein the first end of the optical waveguide is a thin end and the second end of the optical waveguide is a thick end.

3. The optical collimator of claim 1, wherein the collimating end reflector is spherically curved.

4. The optical collimator of claim 1, wherein the faceted lens structure of the collimating end reflector includes a plurality of facets facing the viewing surface and a plurality of facets facing the back surface, each facet facing the viewing surface being positioned adjacent to a facet facing the back surface.

5. The optical collimator of claim 4, wherein each facet facing the viewing surface forms an angle relative to a normal of a surface of the end reflector of three-eighths of a difference between ninety degrees and the first critical angle.

6. The optical collimator of claim 4, wherein each facet facing the back surface forms an angle relative to a normal of a surface of the end reflector equal to three-eighths of a difference between ninety degrees and the first critical angle.

7. The optical collimator of claim 4, wherein each facet facing the viewing surface has a height of less than 500 microns and each facet facing the back surface has a height of less than 500 microns.

8. The optical collimator of claim 1, wherein the back surface includes a second critical angle of internal reflection with respect to a normal of the back surface, wherein the second critical angle of reflection is less than the first critical angle of reflection.

9. The optical collimator of claim 1, wherein the viewing surface of the optical waveguide includes a layer of cladding, and wherein the back surface of the optical waveguide includes a layer of cladding with a different refractive index than the layer of cladding of the viewing surface.

10. The optical collimator of claim 9, wherein the back surface of the optical waveguide includes a cladding and the viewing surface interfaces with air.

11. The optical collimator of claim 1, wherein the back surface of the optical waveguide includes a mirror.

12. The optical collimator of claim 1, wherein the optical waveguide further comprises a first reflective side and a second reflective side, the first reflective side opposite the second reflective side, each reflective side extending from the first end to the second end and from the viewing surface to the back surface.

13. An optical collimator comprising:
    an optical wedge comprising
        a thin end comprising a first light interface;
        a thick end opposite the thin end;
        a viewing surface comprising a second light interface extending at least partially between the thin end and the thick end and having a first critical angle of internal reflection with respect to a normal of the viewing surface;
        a back surface opposing the viewing surface and having a second critical angle of internal reflection with respect to a normal of the back surface, wherein the second critical angle of reflection is less than the first critical angle of reflection; and
        a collimating end reflector arranged at the thick end of the optical wedge, wherein the collimating end reflector comprises a faceted lens structure comprising a plurality of facets arranged at an angle relative to a surface of the thick end, the plurality of facets alternating between facets facing the viewing surface and facets facing the back surface, and the facets having an angle relative to a normal of a surface of the end reflector of three-eighths of a difference between ninety degrees and the first critical angle.

14. The optical collimator of claim 13, wherein the collimating end reflector of the optical wedge is spherically curved.

15. The optical collimator of claim 13, wherein the collimating end reflector of the optical wedge is cylindrically curved.

16. The optical collimator of claim 13, wherein each facet facing the viewing surface has a height of less than 500 microns and each facet facing the back surface has a height of less than 500 microns.

17. The optical collimator of claim 13, wherein the optical wedge further comprises a first reflective side and a second reflective side, the first reflective side opposite the second reflective side, each reflective side extending from the thin end to the thick end and from the viewing surface to the back surface.

18. A method of collimating light via an optical waveguide, the optical waveguide comprising a first end, a second end opposite the first end, a collimating end reflector, a viewing surface extending between the first end and the second end, and a back surface opposing the viewing surface, the method comprising:
    injecting light into the first end of the optical waveguide;
    delivering the light to the collimating end reflector via total internal reflection;
    internally reflecting the light off of the collimating end reflector thereby forming collimated light;
    emitting a first portion of collimated light from the viewing surface at a critical angle of reflection;

internally reflecting a second portion of collimated light from the back surface at an angle equal to the critical angle of reflection, and then emitting the second portion of collimated light from the viewing surface after internally reflecting the second portion of collimated light from the back surface.

19. The method of claim 18, wherein reflecting light off of the collimating end reflector comprises reflecting light from a first set of facets and a second set of facets formed in the collimating end reflector, wherein each facet of the first set of facets comprises a normal that points at least partially toward the viewing surface, and wherein each facet of the second set of facets comprises a normal that points at least partially toward the back surface.

20. The method of claim 19, wherein each of the first set of facets has an angle of three-eighths of a difference between ninety degrees and the critical angle of reflection and each of the second set of facets has an angle of three-eighths of the difference between ninety degrees and the critical angle of reflection.

* * * * *